(12) United States Patent
Martino (10) Patent No.: US 8,074,491 B2
(45) Date of Patent: Dec. 13, 2011

(54) MONITORING GAS LEAKAGE RATES FROM HERMETICALLY SEALED DEVICES

(75) Inventor: Peter Miguel Martino, Windham, NH (US)

(73) Assignee: Seagate Technology LLC, Scotts Valley, CA (US)

( * ) Notice: Subject to any disclaimer, the term of this patent is extended or adjusted under 35 U.S.C. 154(b) by 438 days.

(21) Appl. No.: 12/369,437

(22) Filed: Feb. 11, 2009

(65) Prior Publication Data

US 2010/0199748 A1 Aug. 12, 2010

(51) Int. Cl.
*G01N 15/08* (2006.01)

(52) U.S. Cl. .................................. 73/38; 73/52

(58) Field of Classification Search ....... 73/38, 40–49.8, 73/52
See application file for complete search history.

(56) References Cited

U.S. PATENT DOCUMENTS

| | | | |
|---|---|---|---|
| 3,030,801 A * | 4/1962 | Allen ................................. | 73/38 |
| 3,590,634 A * | 7/1971 | Pasternak et al. ............... | 374/54 |
| 3,926,561 A | 12/1975 | Lucero | |
| 4,464,927 A | 8/1984 | Reid | |
| 4,468,951 A * | 9/1984 | Garcia et al. ...................... | 73/38 |
| 4,532,795 A * | 8/1985 | Brayman et al. .................. | 73/40 |
| 4,557,138 A * | 12/1985 | Dumitriu-Valcea et al. ...... | 73/38 |
| 5,131,261 A * | 7/1992 | Tou et al. .......................... | 73/38 |
| 5,361,625 A * | 11/1994 | Ylvisaker ......................... | 73/38 |
| 5,591,898 A * | 1/1997 | Mayer ................................ | 73/38 |
| 5,817,924 A | 10/1998 | Tuomela et al. | |
| 5,837,888 A | 11/1998 | Mayer et al. | |
| 6,119,506 A | 9/2000 | Gibson et al. | |
| 6,450,009 B1 | 9/2002 | Hartikainen et al. | |
| 6,525,899 B2 | 2/2003 | Hearn et al. | |
| 6,640,615 B1 | 11/2003 | Morrow | |
| 6,964,191 B1 * | 11/2005 | Tata .................................. | 73/38 |
| 6,981,403 B2 | 1/2006 | Ascheman et al. | |
| 7,072,809 B2 * | 7/2006 | Egermann et al. ................ | 703/2 |
| 7,257,990 B2 * | 8/2007 | Bujas et al. ...................... | 73/38 |
| 7,624,621 B2 * | 12/2009 | Firon et al. ...................... | 73/38 |
| 7,815,859 B2 * | 10/2010 | Kennedy et al. ............. | 422/68.1 |
| 2003/0074954 A1 * | 4/2003 | Engle et al. ...................... | 73/38 |
| 2006/0236755 A1 * | 10/2006 | Bujas et al. ...................... | 73/38 |

FOREIGN PATENT DOCUMENTS

JP  62119433 A  5/1987

\* cited by examiner

*Primary Examiner* — David A. Rogers
(74) *Attorney, Agent, or Firm* — Feller, Snider, et al.

(57) ABSTRACT

A method for monitoring a gas leakage rate from a hermetically sealed device, such as a hermetically sealed data storage device with an interior helium atmosphere. In some embodiments, a diffusion rate of inert gas from a hermetically sealed first device is monitored until steady state diffusion is reached, and a standard time constant for the first device is identified. Next, the diffusion rate is monitored for a second sealed device for a portion of the time required for the first device to achieve steady state diffusion, and the time required for the second device to reach steady state diffusion using the standard time constant is calculated.

25 Claims, 5 Drawing Sheets

MONITORING GAS LEAKAGE RATES FROM HERMETICALLY SEALED DEVICES

BACKGROUND

Hermetically sealed devices are used in a variety of applications. Such devices hermetically seal an interior atmosphere within a housing, so that the interior atmosphere is maintained separate from the exterior environment. The interior atmosphere may constitute an inert gas atmosphere, such as helium.

In the manufacturing of data storage devices such as computer hard disc drives with internal inert gas atmospheres, it is often desirable to subject such devices to testing for leakage rates. One possible inert gas for such applications is helium. The upper limit of permissible leakage rate for such devices can be relatively small, such as on the order of $10^{-8}$ cc/sec or less. Detection of such small leakage rates can require the use of sensitive gas measuring equipment, such as a mass spectrometer based gas leak detector.

During testing, the inert gas that leaks from the device is normally caused to be collected in a spectrometer tube that is operated at a high vacuum. In practice, the device may be placed in a vacuum tight canister that is connected to the spectrometer, with the canister and spectrometer tube subjected to vacuum evacuation during the test procedure. Since the interior of the device retains helium at approximately 1 atmosphere, subjecting it to a high vacuum during the leak test and placing significant mechanical loads on the device can provide a baseline measure of seal performance.

Testing loads under such conditions are different from, and larger than, those imposed on the device during actual use. Furthermore, it is possible for the testing loads to damage the device, possibly causing temporary, misleading changes in the leak rate.

Attempts have been made to design testing equipment for helium leakage in which the devices are subjected to ambient atmospheric pressure environment. The device is positioned in an airtight inner canister, the walls of which are made of a polymer that is permeable to the helium contained inside the device housing. The inner canister is then placed in another canister that is subjected to a high vacuum, and the leak test is conducted using a gas detector instrument. Helium leaking from the device gradually raises the helium concentration in the airtight inner canister, and the helium gradually permeates through the polymer walls into the evacuated leak detector. In time, the helium concentration in the inner canister and the permeation rate through the container walls, will reach a steady state condition. At steady state, the helium permeation rate through the container walls is equal to the device leakage rate, and the test is concluded.

This approach has major drawbacks. The time required to reach steady state conditions can take an extremely long time, often measured in weeks or months. Also, the helium permeable airtight inner canister must be mechanically strong as it is exposed to a 1 atmosphere pressure differential. Generally, this means that the inner canister may need to be cylindrically or spherically shaped, and have relatively thick walls, typically several millimeters. Further, there is a relatively large volume of air surrounding the device, and since it is difficult for helium to permeate through the thick canister wall, it takes an excessively long time for sufficient helium to leak from the device into the relatively large air volume about the device and then permeate through the thick wall of the outer canister.

There is a need for an inert gas leak tester that does not require that a hermetically sealed electronic device be subjected to a high vacuum, and which is capable of detecting extremely small leakage rates. Further, the leak tester would provide the testing results within the short time requirements of production manufacturing.

SUMMARY

Various embodiments of the present invention are generally directed to a method for monitoring a gas leakage rate from a hermetically sealed device, such as a hermetically sealed data storage device with an interior helium atmosphere.

In accordance with some embodiments, the method generally comprises monitoring a diffusion rate of inert gas from a hermetically sealed first device until a steady state diffusion rate is achieved; identifying a standard time constant for the first device to reach the steady state diffusion rate; monitoring a diffusion rate of inert gas from a hermetically sealed second device for a portion of the time required for the first device to achieve the steady state diffusion rate; and calculating the time required for the second device to reach steady state diffusion using the standard time constant.

In accordance with other embodiments, the method generally comprises placing a first sealed device in a diffusion chamber having a gas permeable membrane; creating a negative pressure across the membrane to effect gas diffusion there through from the first sealed device; monitoring the gas diffusion from the first sealed device and determining the time constant for the first sealed device to reach steady state diffusion; placing a second sealed device in the diffusion chamber; creating a negative pressure across the membrane to effect gas diffusion there through from the second sealed device; monitoring the gas diffusion from the second sealed device for a pre-determined portion of the time required in step (c); and calculating the time required for the second sealed device to achieve steady state diffusion using the time constant.

In accordance with further embodiments, the method generally comprises providing a test chamber including an upper diffusion chamber and a lower vacuum chamber; placing a first hermetically sealed device in the upper diffusion chamber; connecting the upper diffusion chamber and the lower vacuum chamber so that a gas permeable membrane separates the upper diffusion chamber and lower vacuum chamber; subjecting the lower vacuum chamber to a vacuum whereby a pressure differential is effected across the membrane and gas in the first sealed device diffuses through the membrane; monitoring the gas diffused from the first sealed device and determining the time constant for the first sealed device to reach steady state diffusion; disconnecting the upper and lower diffusion chambers; removing the first sealed device and replacing with a second sealed device in the upper diffusion chamber; connecting the upper diffusion chamber and the lower vacuum chamber so that the gas permeable membrane separates the upper diffusion chamber and the lower vacuum chamber; subjecting the lower vacuum chamber to a vacuum whereby a pressure differential is effected across the membrane and gas in the second sealed device diffuses through the membrane; monitoring the gas diffusion from the second sealed device for a pre-determined portion of the time required during the first monitoring step for the first sealed device; and determining the time required for the second sealed device to achieve steady state diffusion using the time constant.

The features and advances that characterize the various embodiments of the present invention will become apparent upon reading the following detailed description and claims upon reviewing the associated drawings

DESCRIPTION

Various embodiments of the present invention are generally directed to gas leak testing of hermetically sealed devices, such as but not limited to hard disc drives for computers, that have an internal environment of inert gas. Specifically, the embodiments presented for the present invention test the internal gas leakage rate without the need to subject the hermetically sealed device to a high vacuum. The embodiments of the present invention are capable of detecting and therefore monitoring extremely small leakage rates, and are able to perform the tests in a short period of time, usually minutes or hours as compared to much larger testing times of the prior art.

The features of the testing embodiments disclosed generally involve placing the component to be tested in an airtight metal container that is shaped to tightly conform to the shape of the component. The air volume surrounding the component is made relatively small to reduce the time required for the testing conditions to reach steady state conditions.

The floor of the airtight container is made to support a thin, gas permeable polymer membrane. The upper side of the membrane is exposed to the one atmosphere air surrounding the electronic component. The lower side of the membrane is subjected to a high vacuum. As the test proceeds, inert gas in the electronic component diffuses into the one atmosphere air surrounding the component, and then this inert gas is caused to diffuse across the membrane and is drawn into a gas measuring instrument, such as a mass spectrometer or the like.

In some embodiments, the membrane is made of a thin, inert gas permeable polymer membrane, and when the inert gas is helium, the membrane can be a polysulfone, a TPE (thermoplastic polyester elastomer) or a polypropylene. These materials have been found suitable in some embodiments because they tend to combine relatively high helium permeability with relatively high mechanical strength. Higher helium permeability reduces the time needed to reach steady state across the membrane. Higher mechanical strength makes it possible to increase the membrane area, further reducing the time to reach steady state.

It has been found that the testing time for the embodiments of the present invention can be significantly reduced by determining an apparatus time constant, that is, the time required to come to steady state conditions; once this time constant is known for the testing component and apparatus, the test can be significantly time reduced by recording the leak rate prior to reaching steady state and then extrapolating to the value expected at steady state. Once the time constant is recorded for the type of electronic component and the testing apparatus, this extrapolation protocol speeds up testing with only a small reduction in accuracy of results achieved.

In one embodiment of the testing procedure the volume of air surrounding the tested sealed devices is reduced by shaping the airtight cavity to conform to the shape of the sealed devices.

Figure 1:
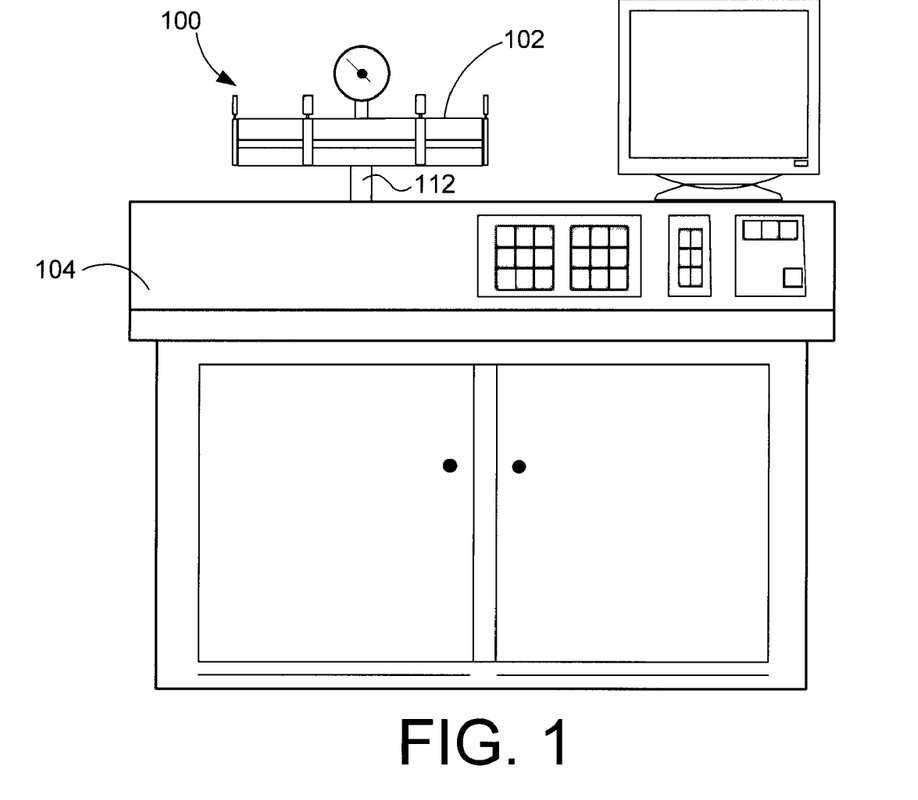
FIG. 1 is an elevational front view of a preferred embodiment of apparatus for monitoring gas leakage rates from hermetically sealed devices.

Prior to describing the testing procedure, a preferred embodiment of the testing apparatus will be undertaken. Referring to the drawings in general, and particularly to FIG. 1, shown therein is an inert gas leakage test assembly 100 constructed in accordance with embodiments of the present invention. Shown is a test canister 102 that is supported by a gas measuring instrument 104, which is a mass spectrometer of conventional construction.

Figure 2:
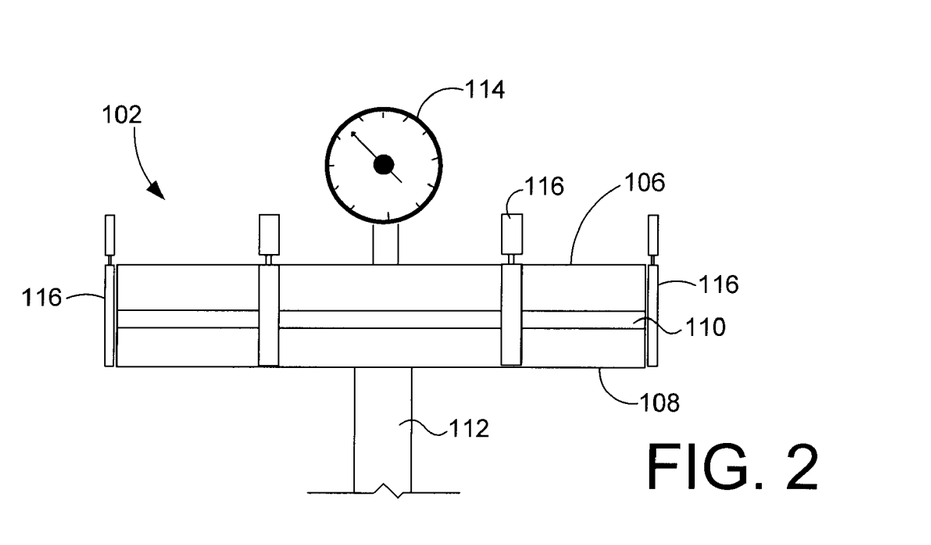
FIG. 2 is an enlarged elevational view of the test canister shown in FIG. 1.
Figure 3:
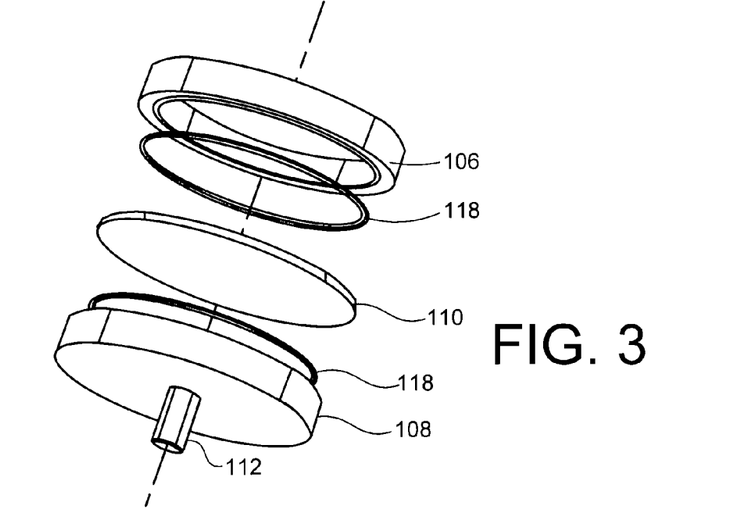
FIG. 3 is an isometric, exploded view of the test canister of FIG. 2.

The test canister 102, perhaps best shown in FIGS. 2 and 3, has an upper diffusion chamber 106, a lower vacuum chamber 108 and a middle plate member 110. A vacuum connecting conduit 112 extending from the lower vacuum chamber 108 is connectable to the gas measuring instrument 104 where it establishes fluid communication with a vacuum pump (not shown). An optional pressure gage 114 is supported by, and is in fluid communication with, the upper diffusion chamber 16.

Several locking clamps 116, or other locking means, can be located about the test canister 102 to secure the upper and lower diffusion cells 106, 108 to clamp the plate member 20 there between. Sealant o-rings 118 are clamped between the upper and lower diffusion cells 106, 108 and the plate member 110.

Figure 4:
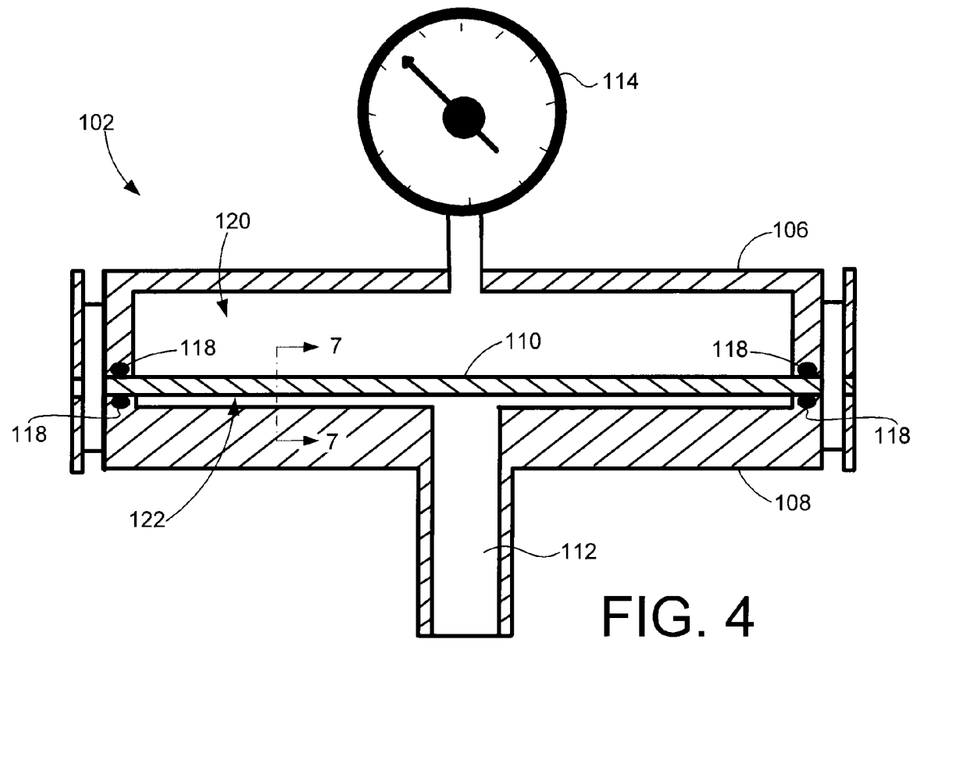
FIG. 4 is a cross-sectional view of the test carrier of FIG. 2.

Turning to the cross-sectional view of FIG. 4, it will be noted that the upper diffusion chamber has a component cavity 120 that is sufficiently dimensioned to contain a component supporting member (not shown in FIG. 4). The lower vacuum chamber 108 has a vacuum cavity 122 that is separated from the component cavity 120 by the plate member 110 and sealed there from by the o-rings 118 that are seated in appropriately sized o-ring grooves (not separately numbered).

Figure 5:
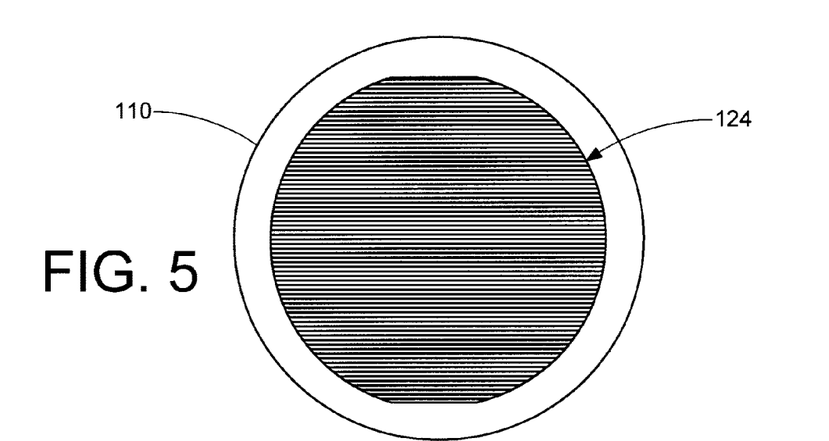
FIG. 5 is a plan view of the middle plate member of the test canister of FIG. 5.
Figure 6:
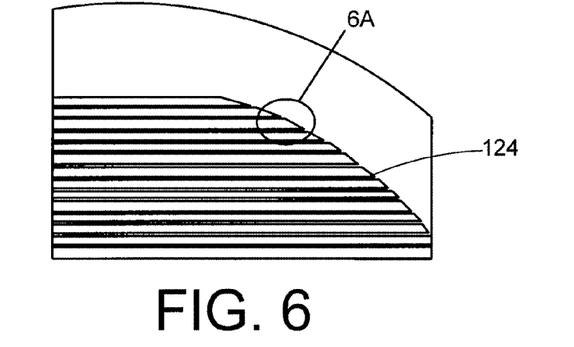
FIG. 6 is an enlarged view of a portion of the plate member of FIG. 5 showing the slots therein.
Figure 6A:
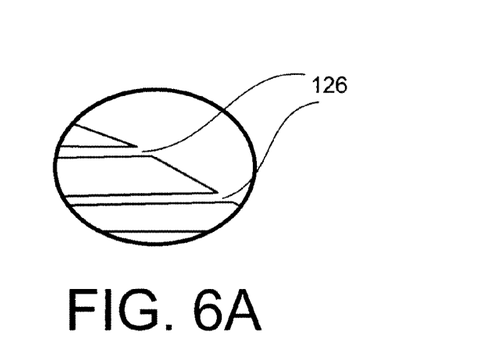
FIG. 6A is an enlargement of the encircled area depicted in FIG. 6.
Figure 7:
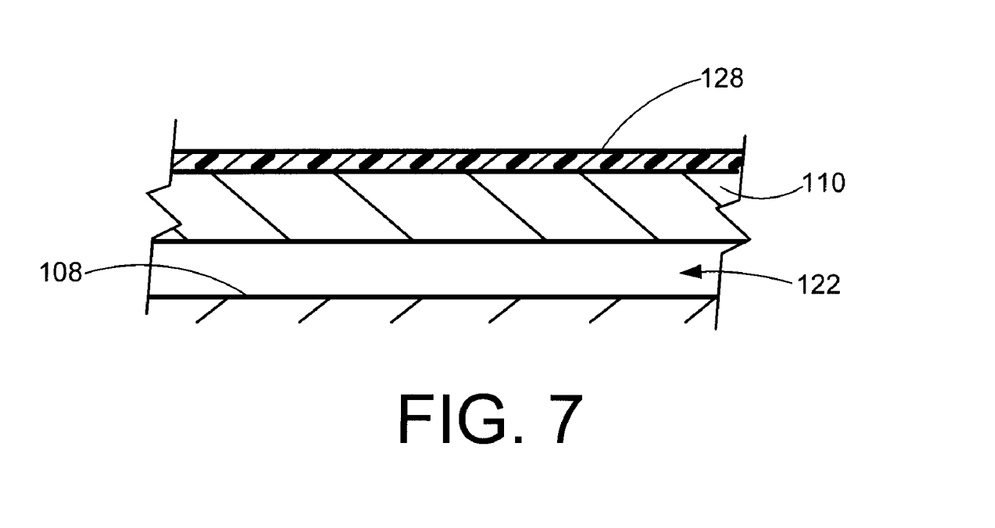
FIG. 7 is a perspective view of an exemplary device loaded in a portion of the test canister of FIG. 2, the device characterized as a hard disc drive.

FIG. 5 shows the plate member 110 as having a slotted central portion 124 that serves to support the membrane separating the upper and lower chambers 106, 108. The central portion 124 has a plurality of slots 126 that are best shown in FIGS. 6-6A. In lieu of the slots 126, the central portion can be provided with other shaped openings. Supported on the plate member 110 over the slots 126 is a polymer membrane 128; the thickness of this membrane is very small and thus is not viewable in FIG. 4, but is depicted in the cross-section shown in FIG. 7. The ribs that form the slots 126 structurally support the membrane 128, as will become clear below, when a pressure differential during vacuum testing is placed across the membrane 128. It will be appreciated that the dimensions of the slots 126 will vary with the strength of membrane used; the stronger the membrane to rupture when exposed to a differential pressure across it, the less support will be necessary, and the ribs forming the slots can be space further apart, thereby providing greater diffusion area.

The pressure gage 114, when included, serves to indicate that the membrane 128 remains intact during testing, since the air pressure surrounding the disc drive being tested will remain at about one atmosphere unless a breach occurs in the membrane 128, in which case the gage 114 will indicate that a vacuum has been drawn on the upper diffusion chamber 106.

Figure 8:
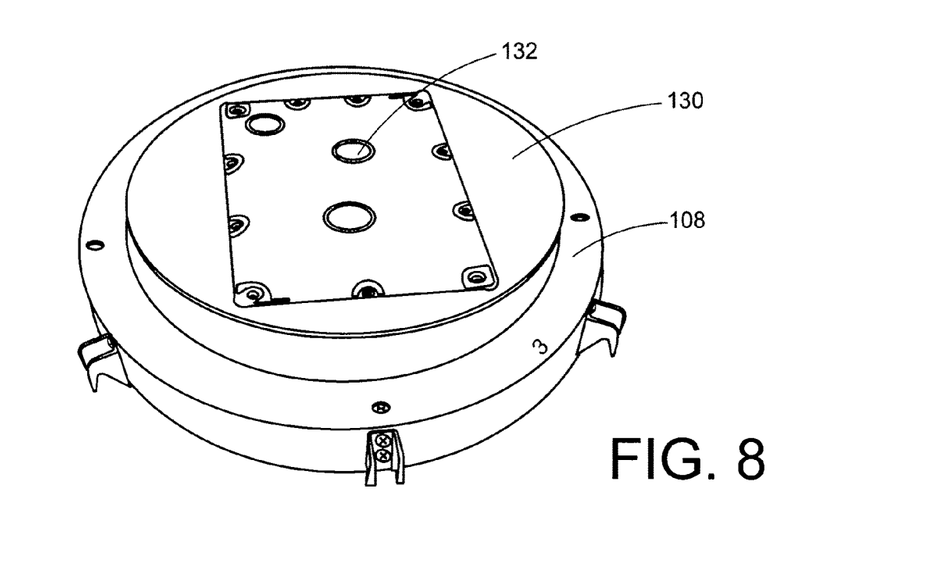
FIG. 8 is a cross-sectional view of a portion of the plate member of FIG. 5 depicting the permeable membrane supported thereon.

FIG. 8 shows a cylindrically shaped space filler member 130 that is dimensioned to be received within the component cavity 120 of the upper diffusion chamber 106 and is supported on the membrane 128 and the plate member 110. The space filler member 130 is shown in FIG. 8 as surrounding a hermetically sealed test device 132, which for the present discussion is contemplated as comprising a hermetically sealed hard disc drive that has an internal environment of an inert gas, such as helium. The space filler member 130 has a component receiving cavity 134 that is dimensioned to closely fit the profile of the disc drive 132; when the space filler member 130 is positioned to be disposed in the component cavity 120, the component cavity 120 will be substantially filled, leaving a relatively small volume of air surrounding the disc drive 132. Thus, the space filler member 130 serves to reduce the air space surrounding the disc drive 132 and the amount of air in the component cavity 120 to a volume below a selected threshold.

The equations governing the performance of the testing apparatus above described when operated at one atmosphere pressure in the component cavity 120 of the gas leakage test assembly 100 will now be described, with the inert gas of the hard disc drive 132 being helium. Such equations relate the design parameters (dimensions, material properties, etc.) of the testing apparatus. Starting from first principles, the rate of change of the helium mass in the air in the component cavity 120 as the membrane is subjected to a high vacuum on the vacuum cavity 122 will be equal to the rate of helium diffusing from the disc drive minus the rate of helium diffusing through the membrane 128 and being drawn into the mass spectrometer 104 by its vacuum pump connected to the vacuum connecting conduit 112.

The starting equation is:

$$dm/dt = V\,d\rho/dt = L_{in} - L_{out} = \text{rate of helium accumulation in air surrounding the drive (kg/sec)} \quad (1)$$

where m is the mass of helium in the air surrounding the drive; t is the time in seconds; V is the volume of air surrounding the drive in cubic meters; and $\rho$ is the concentration of helium in the air around the drive in kilograms per cubic meter.

The solution of this differential equation provides $\rho$ and $L_{out}$ as functions of time. Next, $L_{in}$ and $L_{out}$ are expressed in terms of the leak tester design parameters. Starting with $L_{out}$:

$$L_{out} = (DA)/h \text{ times } \rho = C_{out}\rho \quad (2)$$

where $L_{out}$ is the helium transfer rate from the air surrounding the hard disc drive in kilograms per second; D is the helium permeability of polymer membrane in square meters per second (a physical characteristic of the membrane available from the manufacturer of the membrane); A is the area of the polymer membrane, in square meters, subjected to the helium transfer; and h is the thickness of the polymer membrane in meters. This equation is the gas diffusion law as applied to a thin membrane.

Solving equation (2) for $L_{in}$, the helium transfer rate into the air surrounding the hard disc drive, in kilograms per second, from the hard disc drive:

$$L_{in} = L_d - L_d(\rho/\rho_d) = L_d - C_{in}\rho \quad (3)$$

where $L_{in}$ is the helium transfer rate to the air surrounding the drive in kilograms per second; $L_d$ is the drive leak rate in free space in kilograms per second; and $\rho_d$ is the concentration inside the hard disc drive in kilograms per cubic meter.

$L_{in}$ does not simply equal $L_d$, because the leak rate from the hard disc drive depends on the concentration of helium both inside and outside the hard disc drive. If, at some point the helium concentration outside the hard disc drive becomes equal to the concentration of helium inside the drive, there will be no helium leaking from the drive.

We can now substitute expressions for Lin and Lout into the leak rate equation:

$$V\,d\rho/dt = L_{in} - L_{out} = L_d - C_{in}\rho - C_{out}\rho \quad (4)$$

$$d\rho/dt = [L_d - (C_{in} - C_{out})]\rho/V \quad (5)$$

Assuming there is no helium in the tester at the start of the test (wherein $\rho(0)=0$), solving this differential equation for $\rho(t)$ yields the following:

$$\rho(t) = [L_d/(C_{in}+C_{out})][1-\exp(C_{in}+C_{out}/-V)t] \quad (6)$$

Each element of this formula is a known function of the one atmosphere tester dimensions and material properties, except for $C_{in}$, which is a property of the electronic device 132 being tested. It will be apparent that $C_{in} \ll C_{out}$, because the membrane in the test canister 102 is selected to have high helium transmission, while the electronic device 132 is designed to have a very low helium transmission or loss. Accordingly, this allows the equation to be simplified, yielding the final result, as follows:

$$L_{out}(t) = C_{out}\rho(t) = L_d[1-\exp(C_{out}/-V)t] = L_d[1-\exp(-DA/Vh)t)] \quad (7)$$

This formula governs the performance of a one atmosphere leak detector, that is, the performance of the embodiments of the gas leakage test assembly 100 of the present invention. The leak rate from the tester rises exponentially with the time constant of Vh/DA. This time constant is the time of testing for the leak rate to reach 63 percent of its steady state value.

It has been found in at least certain embodiments that, for optimal performance (achieving an acceptable test result in an acceptably small test time), the volume (V) of air about the electronic component being tested, the disc drive 132, should be as small as practicable. Further, the thickness (h) of the polymer membrane 128 should be as small as practicable, and the area (A) of the membrane through which diffusion occurs should be as large as practicable.

Listed in the following table are physical characteristics and constants of the polymeric membrane materials mentioned herein above for helium gas:

| Material | Trademark | Manufacturer | Strength (Mpa) | Permeability (m²/sec) |
|---|---|---|---|---|
| polysulfone | UDEL | Solvay | 70 | 1.10E−11 |
| TPE | Hytrel | DuPont | 46 | 1.20E−11 |
| polypropylene | | commodity | 36 | 7.00E−12 |
| LDPE | | commodity | 21 | 4.00E−12 |
| HDPE | | commodity | 26 | 9.00E−13 |

Figure 9:
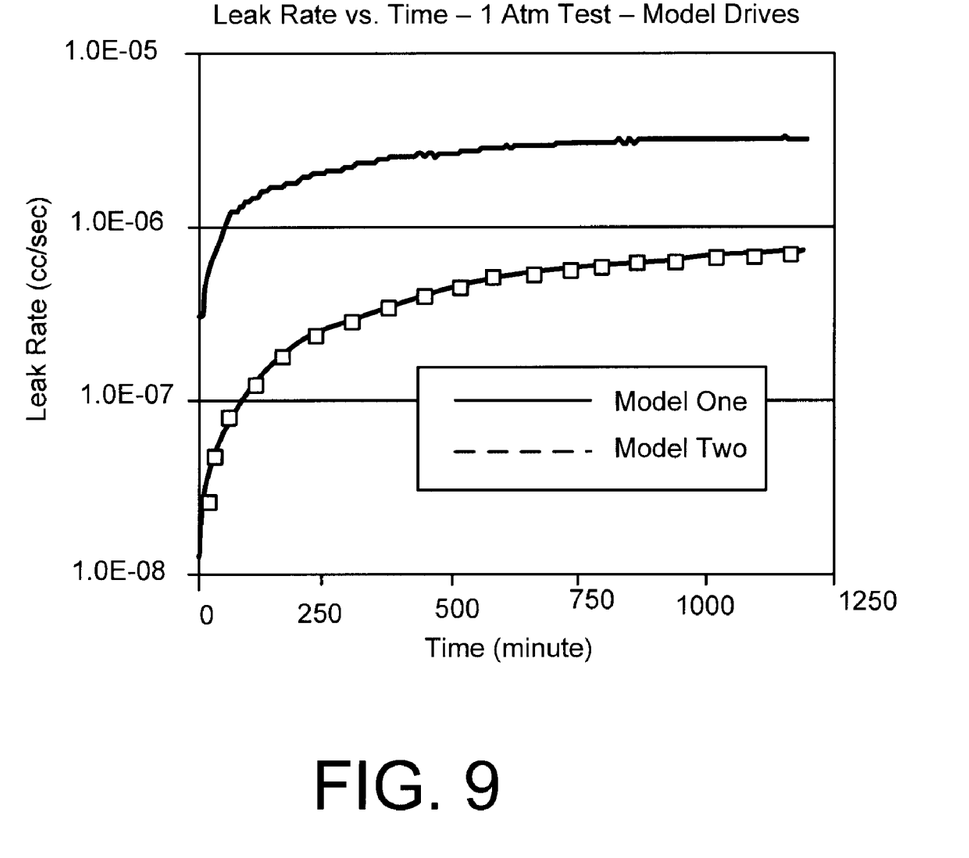
FIG. 9 is a graphical depiction of test results achieved for certain hard disc drives.

Depicted in FIG. 9 are leak rate graphs for results of tests conducted for two disc drives that are designated as model one and model two, such tests conducted utilizing the gas leakage test assembly 100 described herein. For each of the curves in FIG. 9, the leak rate (cubic centimeters/sec) was measured over time, and for each, the time constant was approximately 500 minutes. Further refinement of the test equipment (thinner membrane, membrane in roof of chamber, tighter fit between drive and space filler member, voiding the dead air in the pressure gage, etc.) can probably get the time constant down to a value in the range of about 50 minutes.

The gas leakage test assembly 100 and the theory of operation having been described, the preferable procedure for testing the leakage rate of an hermetically sealed electronic device, such as the hard disc drive 132 described above, is outlined in FIG. 10. At step 200, the test canister 102 is set up by unlatching the locking clamps 116 and removing the upper diffusion chamber 106 from the lower vacuum chamber 108. At step 202, a selected membrane 128 is placed over the slots 126 of the middle plate member 110 over the vacuum cavity 122 in the lower vacuum chamber 108.

Figure 10:
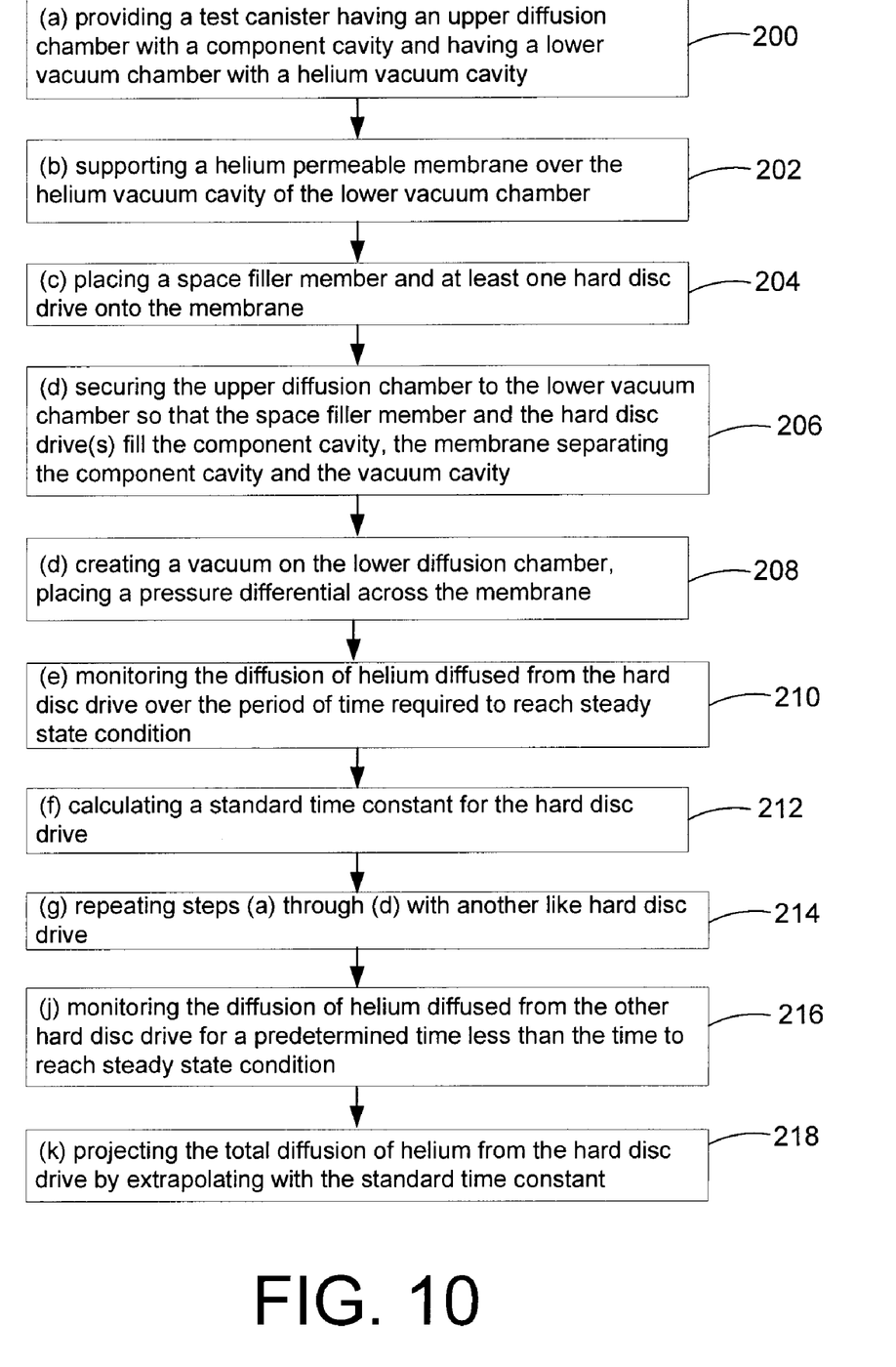
FIG. 10 is a diagrammatical representation of the test procedure of a preferred embodiment of the present invention.

In step 204, the space filler 130 with a hard disc drive onto the membrane 128 and onto the middle plate member 110. It should be noted that the test canister can be selectively dimensioned to receive more than one electronic device, if testing multiple devices is desired. For the illustration purpose of the present discussion, a single hard disc drive 132 will be considered to be under test.

At step 206, the canister 102 is assembled by securing the upper diffusion chamber 106 to the lower vacuum chamber 108 so that the space filler member 130 and the hard disc drive 132 substantially fill the component cavity 120, with the membrane 128 separating the component cavity 120 and the vacuum cavity 122. At step 208, the test canister 102 is connected to the vacuum pump of the mass spectrometer 104, via the vacuum connecting conduit 112, and a vacuum is drawn on the lower vacuum chamber 108, placing a pressure differential across the membrane 128. That is, the vacuum connecting conduit 112 serves as a withdrawal port for the canister 102 and is attached to the inlet of a vacuum pump (not shown) to create a vacuum in the vacuum cavity 122 of the lower vacuum chamber 108. With the component cavity 120 of the upper diffusion chamber 106 at atmospheric pressure, the vacuum on the vacuum cavity 122 places a pressure differential across the membrane 128.

In step 210, the amount of helium diffused from the hard disc drive 132, and withdrawn by the vacuum, is monitored by the mass spectrometer 104. Helium that diffuses from the hard disc drive 132 into the air surrounding the drive is caused to diffuse through the membrane 128 into the vacuum cavity 122 from which it is drawn into the mass spectrometer for measurement. Testing is continued until the steady state condition of no further increase in measured helium leak rate, and in step 212, using the formulas provided above, the standard time constant for the hard disc drive 132 is calculated.

Using this test procedure for other like hard disc drives 132 (step 214), the steps 200 through 208 are repeated with another like hard disc drive 132. At step 216, the mass spectrometer 104 monitors the helium that diffuses from the hard disc drive 132 into the air surrounding the drive and which is caused to diffuse through the membrane 128 into the vacuum cavity 122 for withdrawal into the mass spectrometer for measurement. But, in this step, the test need not be conducted for the time needed to reach steady state conditions. Rather, step 216 calls for monitoring the helium diffusion for a period of time less than that required to reach the steady state condition of no further withdrawal of helium.

At step 218, the amount of diffused helium and the standard time constant are used with the formula above given to extrapolate for the amount of diffused helium and the time required to reach steady state.

That is, once the value of the standard time constant is known for the hard disc drive 132 for the testing setup, tests for other like hard disc drives 132 can be conducted in a much shorter time. Thus, helium leakage can be conducted in a far lesser time than that necessary to reach steady state, so by using the history of testing helium leakage rates in the hard disc drive 132, future testing can be truncated and the final step in the test will be extrapolate for the total diffusion of helium (and/or time to reach such) that can be expected over for the drive.

The tests conducted on helium filled, model disc drives manufactured by the assignee of the present invention, the results of which are reported in the following table. That is, the following are the physical characteristics of the gas leakage test assembly in accordance with present embodiments. The table also contains data obtained for the same drives using prior art testing procedures.

|  | Prior Art (typical) | Present Embodiments |
|---|---|---|
| air volume surrounding device (V, $m^3$) | 8.00E−04 | 4.00E−05 |
| membrane area of diffusion (A, $m^2$) | 6.28E−02 | 2.69E−02 |
| membrane thickness (h, m) | 4.00E−03 | 2.54E−05 |
| hard disc drive leak rate ($L_d$, cc/sec) | 1.00E−08 | 1.00E−08 |
| hard disc drive leak rate ($L_d$, kg/sec) | 1.64E−15 | 1.64E−15 |
| membrane diffusivity ($m^2$/sec) | 1.00E−12 | 1.20E−11 |
| helium concentration in drive ($\rho_d$, kg/$m^3$) | 0.1786 | 0.1786 |
| $C_{in}$ ($m^3$/sec) | 9.18E−15 | 9.18E−15 |
| $C_{out}$ ($m^3$/sec) | 1.57E−11 | 1.27E−08 |
| time constant (sec) | 5.09E+07 | 3.15E+03 |
| time constant (min) | 848760.48 | 52.50 |
| time constant (hr) | 14146 | 0.87 |

It will be noted that the prior art testing procedure would have taken over a year to complete, while testing using embodiments of the present invention took less than an hour.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular control environment without departing from the spirit and scope of the present invention.

While embodiments described herein are generally directed to monitoring helium gas leakage rates from a hard disc drive, it will be appreciated by those skilled in the art that the disclosed apparatus can be used for other types of systems without departing from the spirit and scope of the claimed invention. For example, other types of inert gas atmospheres can be used, and other types of devices can be tested such as solid state data storage devices, medical devices, etc.

What is claimed is:
1. A method comprising:
monitoring a diffusion rate of inert gas that diffuses from a hermetically sealed first device and through an inert gas permeable membrane adjacent the first device until a steady state diffusion rate is achieved;
identifying a standard time constant for the first device to reach the steady state diffusion rate;
monitoring a diffusion rate of inert gas that diffuses from a hermetically sealed second device and through an inert gas permeable membrane adjacent the second device for a portion of the time required for the first device to achieve the steady state diffusion rate; and calculating the time required for the second device to reach steady state diffusion using the standard time constant.

2. The method of claim 1 wherein the inert gas is helium.

3. The method of claim 1 wherein the first and second devices are data storage devices.

4. The method of claim 1 further comprising the step of monitoring the ambient pressure of the first and second devices.

5. The method of claim 1 wherein the monitoring step for the first device comprises:

maintaining the first device at atmospheric pressure on one side of an inert gas permeable membrane; and subjecting the opposing side of the membrane to a vacuum.

6. The method of claim 5 wherein the monitoring step for the second device comprises:

maintaining the first device at atmospheric pressure on the one side of the membrane; and subjecting the opposing side of the membrane to a vacuum.

7. The method of claim 6 wherein the monitoring steps comprises:

measuring the diffused inert gas with a mass spectrometer.

8. A method for determining gas leakage from a hermetically sealed device with an inert gas atmosphere, comprising:

(a) placing a first sealed device in a diffusion chamber having a gas permeable membrane;

(b) creating a negative pressure across the membrane to effect gas diffusion there through from the first sealed device;

(c) monitoring the gas diffusion from the first sealed device and determining the time constant for the first sealed device to reach steady state diffusion;

(d) placing a second sealed device in the diffusion chamber;

(e) creating a negative pressure across the membrane to effect gas diffusion there through from the second sealed device;

(f) monitoring the gas diffusion from the second sealed device for a pre-determined portion of the time required in step (c); and (g) calculating the time required for the second sealed device to achieve steady state diffusion using the time constant.

9. The method of claim 8 comprising minimizing the volume of atmospheric air surrounding the first and second sealed devices.

10. The method of claim 8 wherein the inert gas is helium.

11. The method of claim 8 wherein the first and second sealed devices are hard disc drives.

12. The method of claim 8 further comprising the step of monitoring the ambient pressure of the first and second sealed devices.

13. The method of claim 8 wherein the monitoring step for the first sealed device comprises:

maintaining the diffusion chamber substantially at atmospheric pressure on one side of an inert gas permeable membrane; and subjecting the opposing side of the membrane to a vacuum.

14. The method of claim 13 wherein the monitoring step for the second sealed device comprises:

maintaining the diffusion chamber at atmospheric pressure on the one side of the membrane; and subjecting the opposing side of the membrane to a vacuum.

15. The method of claim 14 wherein each of the monitoring steps comprises:

measuring the diffused inert gas with a mass spectrometer.

16. A method for measuring the gas diffusion rate of a hermetically sealed device having an inert gas atmosphere, comprising:

(a) providing a test chamber including an upper diffusion chamber and a lower vacuum chamber;

(b) placing a first hermetically sealed device in the upper diffusion chamber;

(c) connecting the upper diffusion chamber and the lower vacuum chamber so that a gas permeable membrane separates the upper diffusion chamber and lower vacuum chamber;

(d) subjecting the lower vacuum chamber to a vacuum whereby a pressure differential is effected across the membrane and gas in the first sealed device diffuses through the membrane;

(e) monitoring the gas diffused from the first sealed device and determining the time constant for the first sealed device to reach steady state diffusion;

(f) disconnecting the upper and lower diffusion chambers;

(g) removing the first sealed device and replacing with a second sealed device in the upper diffusion chamber;

(h) connecting the upper diffusion chamber and the lower vacuum chamber so that the gas permeable membrane separates the upper diffusion chamber and the lower vacuum chamber;

(i) subjecting the lower vacuum chamber to a vacuum whereby a pressure differential is effected across the membrane and gas in the second sealed device diffuses through the membrane;

(j) monitoring the gas diffusion from the second sealed device for a pre-determined portion of the time required in step (e); and (k) determining the time required for the second sealed device to achieve steady state diffusion using the time constant.

17. The method of claim 16 further comprising:

configuring the air volume surrounding the first sealed device in the upper diffusion chamber to be below a preselected threshold.

18. The method of claim 17 further comprising:

configuring the air volume surrounding the second sealed device in the upper diffusion chamber to be below a preselected threshold.

19. The method of claim 16 further comprising:

positioning a slotted support member to support the membrane.

20. The method of claim 16 wherein the inert gas is helium.

21. The method of claim 16 wherein the first and second sealed devices are hard disc drives.

22. The method of claim 16 further comprising the step of monitoring the ambient pressure of air surrounding the first and second sealed devices in the upper diffusion chamber.

23. The method of claim 16 wherein the monitoring step for the first sealed device comprises:

maintaining the upper diffusion chamber substantially at atmospheric pressure on one side of the membrane as the opposing side of the membrane is subjected to the vacuum.

24. The method of claim 16 wherein the monitoring step for the second sealed device comprises:

maintaining the upper diffusion chamber substantially at atmospheric pressure on one side of the membrane as the opposing side of the membrane is subjected to the vacuum.

25. The method of claim 16 wherein each of the monitoring steps comprises:

measuring the diffused inert gas with a mass spectrometer.

* * * * *